June 6, 1950  L. A. DE ROSA  2,510,087
PHASE SHIFTER
Filed Oct. 20, 1945  5 Sheets-Sheet 1
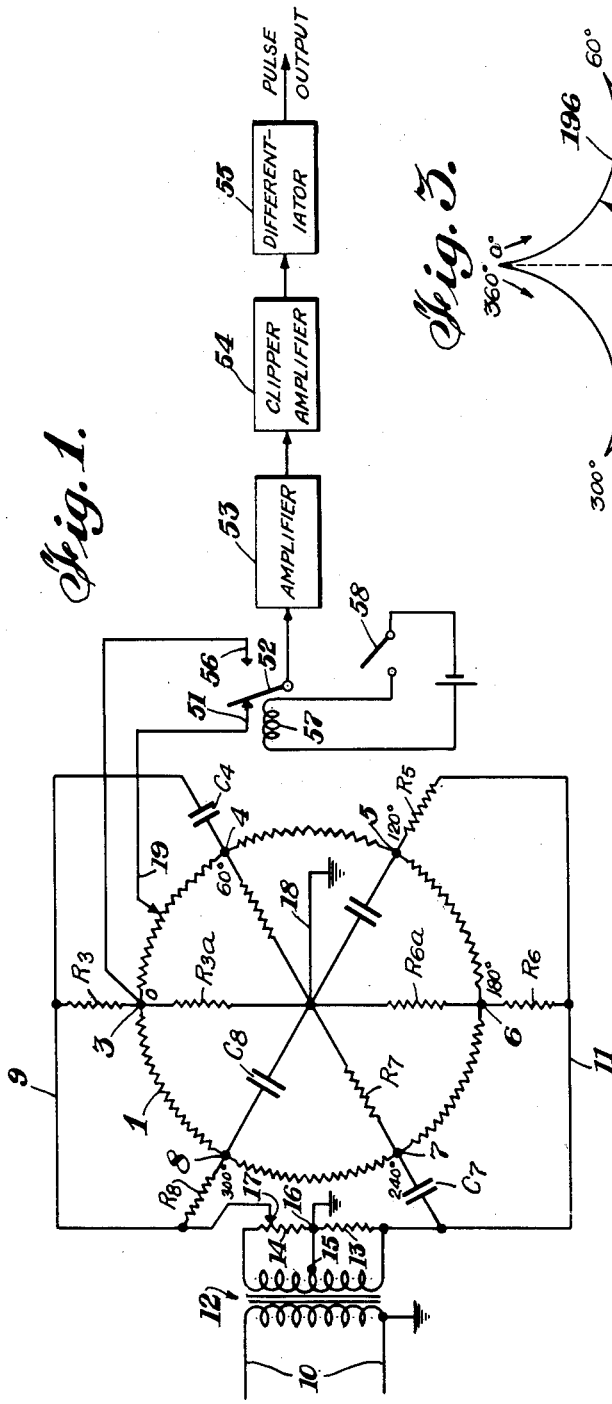
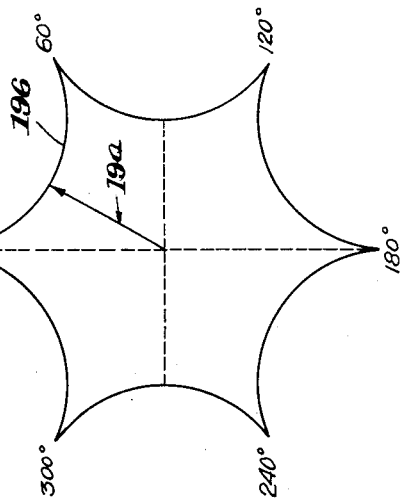
INVENTOR.
LOUIS A. DE ROSA
BY Percy P. Lantzy
ATTORNEY

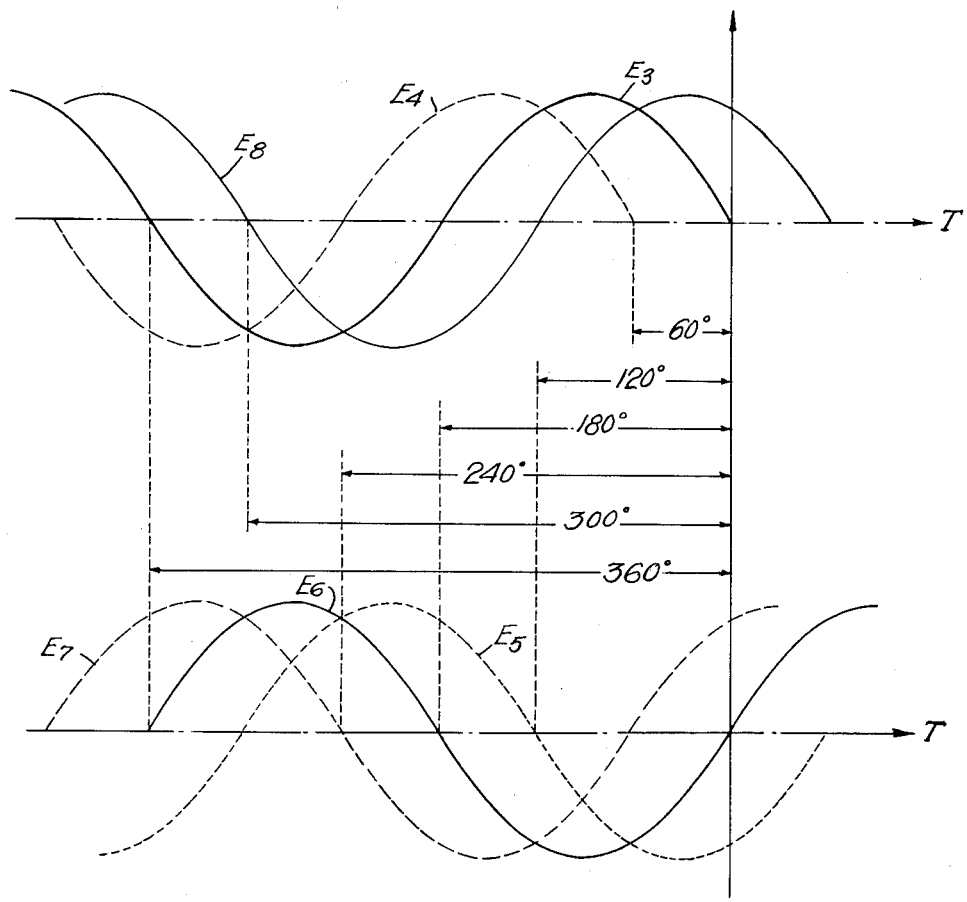

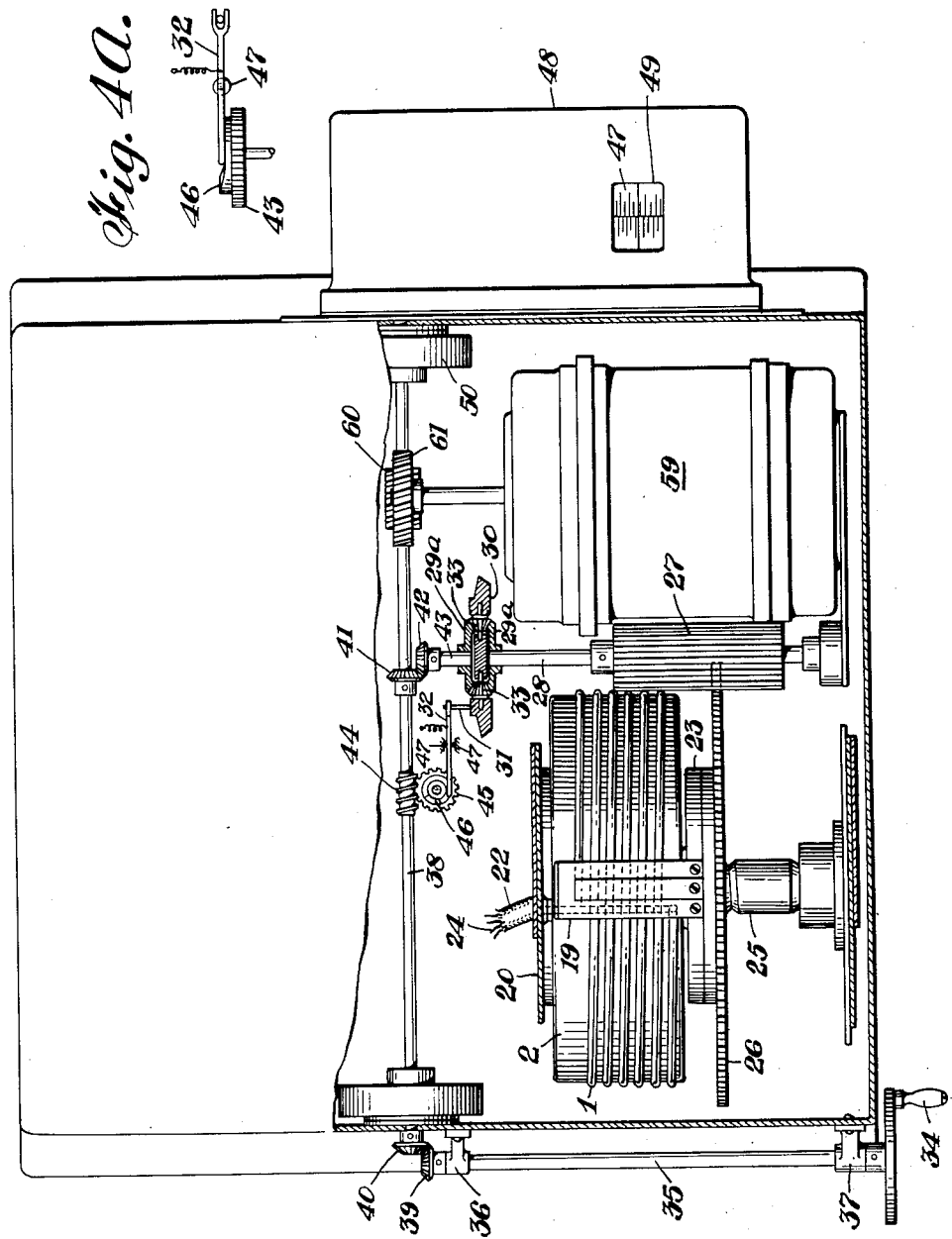

June 6, 1950  L. A. DE ROSA  2,510,087
PHASE SHIFTER

Filed Oct. 20, 1945  5 Sheets-Sheet 4

INVENTOR.
LOUIS A. DE ROSA
BY
ATTORNEY

June 6, 1950 — L. A. DE ROSA — 2,510,087
PHASE SHIFTER
Filed Oct. 20, 1945 — 5 Sheets-Sheet 5

INVENTOR.
LOUIS A. DE ROSA
BY Percy P. Lantry
ATTORNEY

Patented June 6, 1950

2,510,087

UNITED STATES PATENT OFFICE 2,510,087

PHASE SHIFTER

Louis A. de Rosa, Bloomfield, N. J., assignor to Federal Telephone and Radio Corporation, New York, N. Y., a corporation of Delaware Application October 20, 1945, Serial No. 623,468

4 Claims. (Cl. 323—125)

This invention relates to alternating current phase shifters, and more particularly to a phase shifting device for shifting phase linearly throughout a scale range from 0° to 360°.

One of the objects of my invention is to provide a compact, highly accurate phase shifter capable of fine adjustments for shifting phase linearly through substantially 360°.

Another object of my invention is to provide a linear phase shifter to which alternating current is applied and an output pulse is produced defining a given point on the period of the alternating current which may be used as a reference pulse for use in radio detection systems and for other purposes.

A further object of the invention is to provide a linear phase shifter with means whereby the zero calibration thereof can be quickly checked without changing the phase adjustment thereof.

A still further object of my invention is to provide a linear phase shifter in which phase shifting is accomplished linearly during the manual linear adjustment of a control means or drive means for said phase shifting device.

The above and other objects of the invention will become more apparent upon consideration of the following detailed description to be read in connection with the accompanying drawings, in which:

Fig. 1 is a schematic wiring and block diagram of one embodiment of the invention;

Fig. 2 is a graphical illustration of the phase shifting operation according to my invention;

Fig. 3 is a graphical illustration of a vector diagram showing the variation in amplitude of the output voltage of the phase shifter for different degrees of phase shift;

Fig. 4 is a fragmentary plan view of the phase shifter showing certain construction features thereof;

Fig. 4a is a view in vertical section of a portion of Fig. 4;

Figure 5:
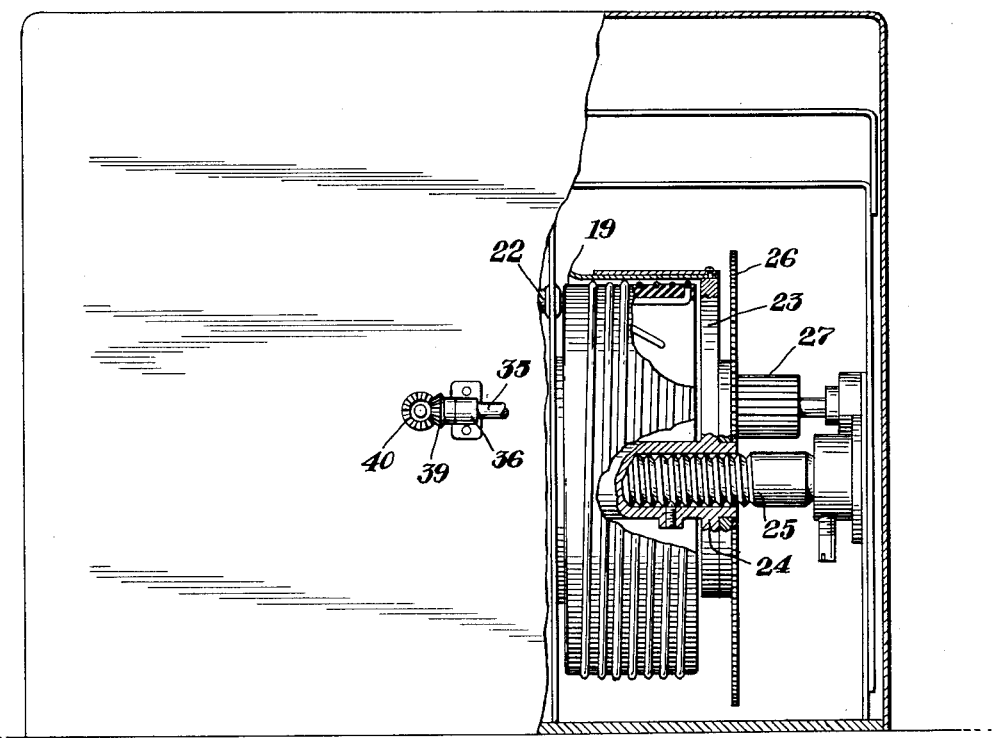
Fig. 5 is a vertical sectional view of Fig. 4 with parts broken away to show diagrammatically the arrangement of the impedance network of the phase shifter.

In phase comparison direction finding systems and radio detection systems there is great necessity for obtaining a linear phase shift having no deviation from linearity at any point throughout substantially 360°. This is particularly so where the phase shift indication is desired at some remote point, such as may be provided by using a Selsyn motor system.

Impedance networks have been designed to cooperate with other components such as capacitive reactances and inductive reactances to compensate for non-linearity, but such systems are unable to overcome certain obstacles in design and operation. My invention, in one form, resides in a cam adjustment-controlled differential to provide a compensating motion to effectively produce a linear phase shift when adjustments in phase are made by a hand wheel or other drive means. Experiments have shown that certain errors occur in phase shift adjacent opposite ends of each part of the impedance network. According to the present invention the differential drive is arranged to produce an advancement or retardation of the position of a movable contact along the impedance network, this variation to occur repetitiously throughout each section of the network.

Turning first to Fig. 1 of the drawings, the embodiment of the invention therein illustrated includes a potentiometer resistor 1 which is made of resistor wire closely wound in a small diameter and arranged preferably in the form of a spiral about an insulator drum 2 with the two ends thereof connected together to form in effect a continuous resistor element such as illustrated in Fig. 1. The potentiometer resistor is divided into six sections as indicated by the points of network connections 3 to 8. Connection points 3, 4 and 8 have applied thereto, through parts of the network hereinafter described, one side 9 of an alternating current source 10. The points of connection 5, 6 and 7 are connected by the network to opposite side 11 of the same alternating current source. The source 10 includes a transformer 12, the secondary of which is connected across resistors 13 and 14 to the two sides 9 and 11. The center tap 15 of the secondary is connected to a center connection 16 between the resistors 13 and 14, and grounded. In order to insure accurate division of the secondary with respect to ground, the side connection 9 is provided with a movable contact 17 so that proper adjustment of this balance can be obtained.

If desired, the load resistors 13 and 14 may be balanced by replacing the transformer 12 by two identical transformers, one placed across the resistor 13 and the other placed across the resistor 14.

The impedance network associated with the potentiometer coil 1 comprises in this embodiment a number of resistors and condensers. The connection points 3 and 6 are provided with two resistor elements $R_3$, $R_{3a}$ and $R_6$, $R_{6a}$ respectively. These resistors are selected equal in value. The resistors $R_3$ and $R_6$ and connected to the opposite side connections 9 and 11 respectively and the resistors $R_{3a}$ and $R_{6a}$ are connected to ground at a common ground connection 18. Since the IR drops across these resistors are in phase with the applied voltages between the two sides 9 and 11 on the one hand and ground 18 on the other hand, the phase at the points 3 and 6 will be exactly 180° difference in accordance with the phase difference between the opposite terminals of the secondary of the transformer 12. In Fig. 2 applied voltage across the side connections 9 and 11 for an instantaneous value is represented by the curves $E_3$ and $E_6$. Since the IR drops to the points 3 and 6 are in phase with the voltages between the side connections 9 and ground, and 11 and ground, the curves $E_3$ and $E_6$ represent the voltages at the points 3 and 6. Using point 3 as a reference point for the point 6 will then represent a phase difference therefrom of 180°.

To point 4 (Fig. 1) is connected a condenser $C_4$ and a resistor $R_4$. The condenser $C_4$ is connected to the side 9 thereby providing a phase advancement at point 4 with respect to the phase at point 3. The resistor $R_4$ is connected to ground 18, and the ratio of the IR drop of the resistor $R_4$ with respect to the reactance of condenser $C_4$ determines the shift in place from point 3 to point 4. These values of $R_4$ and $C_4$ are so selected as to provide a ratio giving point 4 a phase advancement of 60° with respect to point 3. This phase shift is indicated by the curve $E_4$ (Fig. 2).

Point 5 is likewise provided with a resistor $R_5$ and a condenser $C_5$. The connecting relation of these two elements with respect to the side 11 and ground 18 is the reverse of the connections $R_4$ and $C_4$. That is, the resistor $R_5$ is connected to the opposite side connection 11 and the condenser $C_5$ is connected to ground 18. In this reverse arrangement a condenser resistor ratio provides a phase radiation with respect to the side 11 to ground. Thus, since point 6 is 180° different in phase from point 3, a phase radiation of 60° will make point 5 120° out of phase with respect to point 3. This phase condition of point 5 is indicated by curve $E_5$ (Fig. 2).

Point 7 is provided with a resistor $R_7$ connected to ground 18 and a condenser $C_7$ connected to the side 11. This provides a phase advancement similar to the R.-C. ratio for point 4. This phase advancement is with respect to point 6 and gives point 7 in a clockwise direction in Fig. 1 a phase difference with respect to point 3 of 240° as indicated by curve $E_7$ (Fig. 2).

Point 8 is provided with a condenser $C_8$ connected to ground 18 and a resistor $R_8$ connected to the side 9. This provides a phase retardation of 60° with respect to the voltage applied to point 3 as indicated by curve $E_8$. The point 8 also has a corresponding phase advancement with respect to point 7 so that the phase difference in a clockwise direction with respect to point 3 is 300°.

It will be understood that $R_4$, $R_5$, $R_7$ and $R_8$ are of a given resistance and condensers $C_4$, $C_5$, $C_7$ and $C_8$ are of a given capacitance so that advancement and retardation of phase, as the case may be, between the successive points will be 60° for each section. It will also be understood that instead of measuring or calibrating the phase shifter in a clockwise direction, the calibration may be counter-clockwise.

The output voltage from the phase shifter is taken off by a movable contact 19 which engages the potentiometer resistor 1 and is adapted to be moved therealong from point to point as desired. As the contact 19 is moved from point 3 toward point 4, the phase difference of the output voltage is an advancement with respect to the phase at point 3. This variation of the total phase shift between points 3 and 4 is proportional to the position at which the contact 19 is located between these two points. Since the contact may be moved the full length of the potentiometer resistor, the output voltage may be given any desired phase shift up to 360° with respect to the phase of the applied voltage at point 3. It must be understood however, that the variation of the phase between points 3 and 4 along the resistor may not be linear due to errors introduced by irregularities in the operating characteristics of the inductive reactances, capacitive reactances and resistance values shown at $C_4$, $R_4$ and $R_{3a}$. Before proceeding to a further discussion of means of overcoming this non-linearity, we shall discuss certain construction features to secure a better understanding of my invention.

Referring now to Figs. 4 and 5, the potentiometer resistor 1 is provided with the connection points 3—8 through openings in the insulator drum 2 so that the connections to the resistors and condensers are passed inwardly of the drum. The resistors and condensers may be located in the drum or preferably on the support 20 where they are easily accessible for adjustment during testing of the assembly. The wires 21 connecting the resistors and condensers are led through a cable 22. The connection arrangement makes for a compact phase shifter whereby the movable contact 19 is movable about the outside of the drum.

For adjustment of the contact 19, the contact is supported on an arm 23 carried by an internally threaded hub 24 supported on a threaded shaft 25. The hub 24 also carries a gear 26 which meshes with an elongated pinion 27. The pinion 27 is carried by a shaft 28 suitably supported in a parallel relation with respect to the shaft 25. Shaft 28 is connected to one of two bevel gears 29a of a conventional differential gear assembly. A ring gear 30 is held in a steady position by an actuating rod 31 articulated with a lever 32. Planetary gears 33 held in ring gear 30 mesh with the alternate bevel gear 29b. A hand crank 34 carried by a shaft 35 mounted on brackets 36, 37 is arranged to drive a shaft 38 through bevel gears 39 and 40. Mounted further along on shaft 38 is a bevel gear 41 meshing with bevel gear 42 to drive shaft 43 which in turn drives bevel gear 29b of the differential gear assembly.

When the crank 34 is operated, rotation of shaft 43 in one direction causes shaft 28 to rotate in the opposite direction at the same speed, but only so long as ring gear 30 is held steady. Mounted on shaft 38 between bevel gears 40 and 41 is a worm gear 44 meshing with worm drive gear 45, upon which is mounted a lift cam 46 bearing against lever 32 for a portion of the revolution of gear 45. Lever 32 is supported midway by bearing points 47. As lift cam 46 bears against one end of lever 32 a corresponding pressure at the other end of lever 32 is exerted against actuating rod 31, causing an upset of the steady state of ring gear 30. This upset is gradual, according to the shape of lift cam 46, and the rotation of ring gear 30 occurs only during the period of contact between lift cam 46 and lever 32, ring gear 30 taking up its original position as soon as lever 32 bears against the base of gear 45 during portions of the revolution of the gear 45.

Bevel gears 39 and 40 should preferably have a ratio of 1 to 1, as should bevel gears 41 and 42. The ratio of worm gear 44 to worm drive gear 45 should preferably be 6 to 1. It will therefore be clear that during the rotation of shaft 38 a similar rotation equal in speed but opposite in direction will occur at shaft 28. However, this occurs throughout a greater or lesser number of revolutions equal to the size or shape of lift cam 45 on gear 46. Due to the fact that the ratio of 6 to 1 of the worm gear assembly provides an advancement or retardation in angular position of shaft 28 at some time during a cycle of six revolutions of shaft 38, it will be clear that linear motion of shaft 38 will provide a non-linear motion of shaft 28.

Measuring in circular mechanical degrees of rotation, shaft 38 in a cycle of six revolutions will pass through 2160 degrees angular displacement, and correspondingly, shaft 28 will pass through the same number of degrees. Dependent upon the position in the cycle and the size of lift cam 46, a retardation or advancement in angular displacement of shaft 28 will occur. Shaft 28 transmits through pinion 27 this cyclical rotation which in turn is transmitted to gear 26. The ratio of pinion 27 and gear 26 should preferably be 6 to 1 also.

We now have clearly shown that by turning hand wheel 34 six times, movable contact 19 revolves through 360° of rotation while bearing against resistor 1. At a predetermined number of degrees in the circular rotation of movable contact 19 its position has been advanced or retarded non-linearly with respect to the linear motion of hand wheel 34 according to the positioning of lift cam 46 in its cycle of rotation, as well as its size. Additionally, hub 24 is caused to rotate and at the same time traverse the shaft 25 in an axial direction. This causes the contact 19 to follow the spiral of the potentiometer-resistor 1 as wound on drum 2.

For indication of the phase shift of the output voltage, I provide a rotatably mounted, calibrated drum 47 contained in housing 48. The housing has a window 49 through which the calibrations on the drum are viewed. The drum 47 is driven by a suitable reduction gear shown generally at 50 connected to shaft 38. Preferably, the drum 47 is arranged to make one complete rotation for a complete movement of contact 19 from end to end along the length of the potentiometer element 1.

The amplitude of the output voltage is indicated by a vector 19a in Fig. 3. As the contact 19 is moved along the potentiometer resistor 1, the vector 19a will be moved almost proportionally in angular displacement, and will trace an amplitude output curve 19b. This output voltage varies in amplitude from point to point because of the resistance of the potentiometer element 1. As the contact approaches each point, the voltage will increase to a maximum and when the contact approaches the center portion of a section of the potentiometer element the amplitude will approach a minimum.

As shown in Fig. 1, the output voltage from the contact is conducted through relay contacts 51, 52 to an amplifier 53 of one or more stages whereby the voltage is amplified preparatory to a clipping and differentiating operation performed by a clipper 54 and differentiator 55. The pulse output may be used directly as pulse energy to provide a reference indicator on the oscillograph of a radio detection system as disclosed in my copending application, Serial No. 464,008, filed Oct. 31, 1942. One amplifying, clipping, and differentiating circuit that may be used to produce these pulses is disclosed in detail in my copending application, Serial No. 484,795, filed April 24, 1943, now Patent Number 2,483,403 issued Sept. 6, 1949.

To check the zero phase calibration of the phase shifter without having to crank the contact 19 back to point 3, I provide a relay contact 56 connected to point 3. By controlling energization of relay coil 57 by switch 58, the movable contact 52 can be made to give alternately zero phase and the phase shift according to the location of the contact 19.

For remote indications of phase shift, the contact adjustment may be transmitted over a Selsyn motor circuit. For this purpose, I show a local Selsyn motor 59 driven off the shaft 38 by a worm 60 and worm gear 61.

Figure 6:
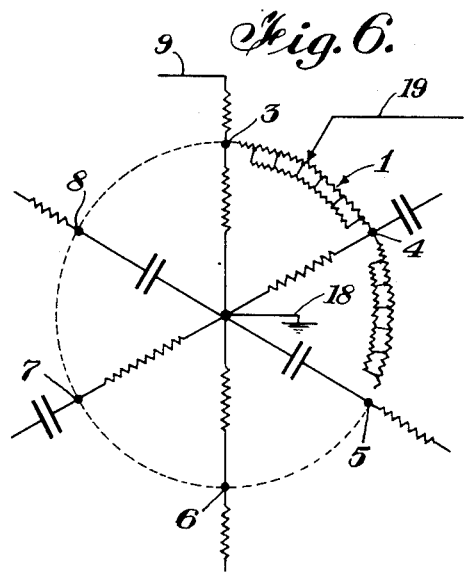
Figs. 6 and 7 are schematic illustrations of further embodiments of the invention.
Figure 7:
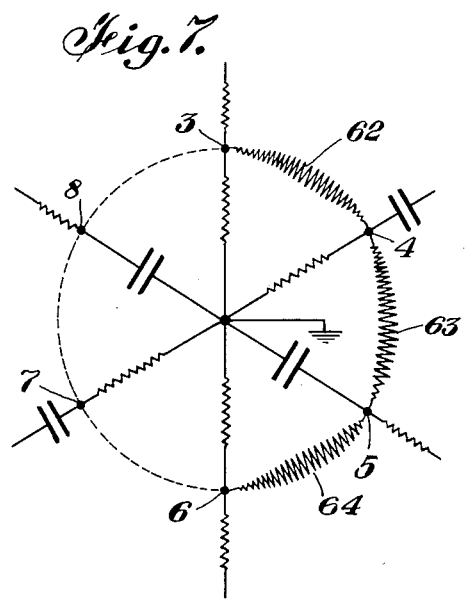

In Figs. 6 and 7, I have shown two additional embodiments of the invention. In Fig. 6, the impedance network 1 comprises resistors which may be arranged in a parallel series circuit to provide a variation in resistance value from point to point throughout 360° of rotation of contact 19. This method of construction will result in the production of a substantially linear phase shift effectively equivalent to a linear motion in mechanical degrees of contact 19.

In Fig. 7 the network comprises the combination of resistors and condensers as shown in arrangement of Fig. 1 by resistors 62, 63 and 64, taking the place of the resistive element 1 of Fig. 1. These resistors are specially formed or treated after manufacture to provide a tapered resistance between points 3 and 4, points 4 and 5 and points 5 and 6. One preferable method of obtaining this tapered resistance is by causing resistive element 1 to be reduced in diameter or cross section by an abrading operation after it has been wound on drum 2. This abrading operation is performed for each 60° portion of resistive element 1, and, according to the particular values chosen for the condensers and resistors of the network, the portions of each 60° section may be so abraded as to provide a variation in resistance at a point or series of points therealong. This variation in resistive value is made to compensate for any advancement or retardation of phase shift as contact 19 is moved along resistor 1. However, the method of assuring linear phase shift shown by Fig. 4 is preferable because the effect of changes in temperature in a single resistor is more easily minimized than when using resistors of different values or tapered values in the network.

The embodiments in Figs. 6 and 7 however, carry out the principles of my invention inasmuch as they secure a linear phase shift. Various combinations of resistors, condensers and inductances, or simply resistors and inductances may be made to secure an equivalent phase shift which will be linear, provided the modifications according to my invention are incorporated therein. Two such circuits are more fully described in my aforesaid copending application, Serial No. 484,795.

Figure 8:
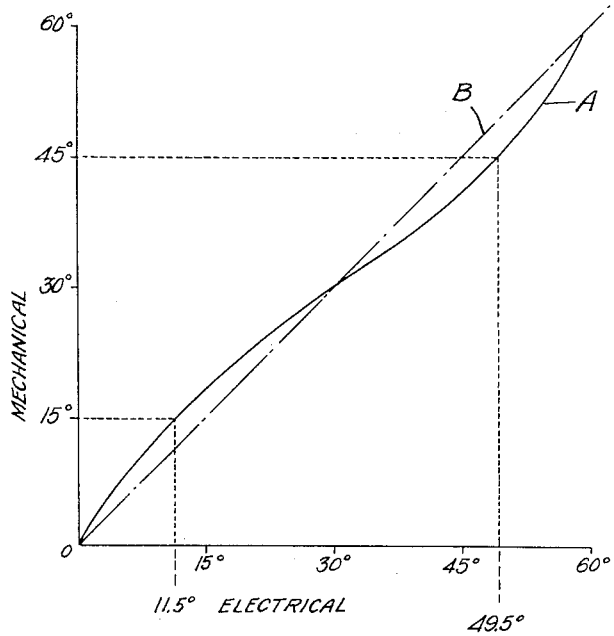
Fig. 8 is a graphical illustration showing the relationship between a desired phase shift accomplished through the use of my invention as related to phase shift secured through the use of a normal impedance network.

In Fig. 8 I show a graphical representation of phase shift which has been exaggerated merely by way of example. The diagram shows a curve A representing a possible phase shift from 0 to 60° as might be obtained in a known resistor potentiometer phase shifter. The curve shows that when the mechanical contact 19 is at a position on resistor 1 corresponding to 15° mechanical, there is an apparent lag in phase shift or deviation from a linear phase shift curve B of 3.5 degrees electrical. In other words, the pointer 19 would have passed through 15 degrees of rotation to secure a phase shift of 11.5 degrees electrical, while at a position of 45° mechanical for pointer 19 the phase shift would become 49.5°, or an advancement of 4.5°. In effect the motion imparted by certain embodiments of my invention serves to effectively increase or decrease the number of degrees of mechanical rotation of contact 19 to secure the phase shift as shown by curve B. It will be understood, of course, that curve A is illustrative only and that for different phase shifting networks the variations may be somewhat different, due to materials, workmanship, etc.

While I have disclosed the principles of my invention in connection with several different embodiments, it will be understood that these embodiments are given by way of example only and not as limiting the scope of the invention as set forth in the objects and the appended claims.

I claim:

1. The device for shifting phase according to claim 2 wherein the means for compensating for variation in phase shift includes a differential system having a control connection to control translation of movement from the input and output connections thereof, the output connection being in control of the position of said output contact, and means to vary said control connection during movement of said contact between at least certain of said points.

2. A device for shifting phase linearly comprising a drum, an impedance network mounted on said drum including a potentiometer-resistor having parts of the network connected thereto at a plurality of points along the resistor, means for applying one side of an alternating current source to the network parts connected to one group of said points, and the other side of said source to the network parts connected to another group of said points, whereby a phase difference exists between adjacent points, an output contact adjustable along said resistor, the output energy being non-linearly shifted in phase with respect to said alternating current source upon a given adjustment of said contact between at least two of said points, control means adjustable in mechanical degrees for controlling the adjustment of said contact, and means to vary translation of movement between said control means and said contact to compensate for variation in phase shift of electrical degrees with respect to a corresponding adjustment of said control means in mechanical degrees.

3. A device for shifting phase linearly comprising a drum, an impedance network mounted on said drum including a potentiometer-resistor having parts of the network connected thereto at a plurality of points along the resistor, means for applying one side of an alternating current source to the network parts connected to one group of said points, and the other side of said source to the network parts connected to another group of said points, whereby a phase difference exists between adjacent points, an output contact adjustable along said resistor, the output energy being non-linearly shifted in phase with respect to said alternating current source upon a given adjustment of said contact between at least two of said points, control means for controlling the adjustment of said contact, and means to vary the translation of movement between said control means and said contact to compensate for variation in phase shift with respect to operation of said control means.

4. A phase shifting device for shifting phase linearly comprising a drum, an impedance network mounted on said drum including a potentiometer-resistor having parts of the network connected thereto at points spaced therealong to produce a given shift in phase between such points, the network being arranged to produce a phase shift which is accumulative from point to point, means to apply alternating current to said network, an output contact adjustable along said resistor, control means to operate said output contact, and means for varying translation of motion between said control means and said contact in a given manner to insure a phase shift which bears a linear relation to adjustment of said contact along said resistor.

LOUIS A. DE ROSA.

REFERENCES CITED

The following references are of record in the file of this patent:

UNITED STATES PATENTS

| Number | Name | Date |
|---|---|---|
| 446,490 | Weston | Feb. 17, 1891 |
| 2,085,940 | Armstrong | July 1, 1937 |
| 2,241,615 | Plebanski | May 13, 1941 |